UNITED STATES PATENT OFFICE.

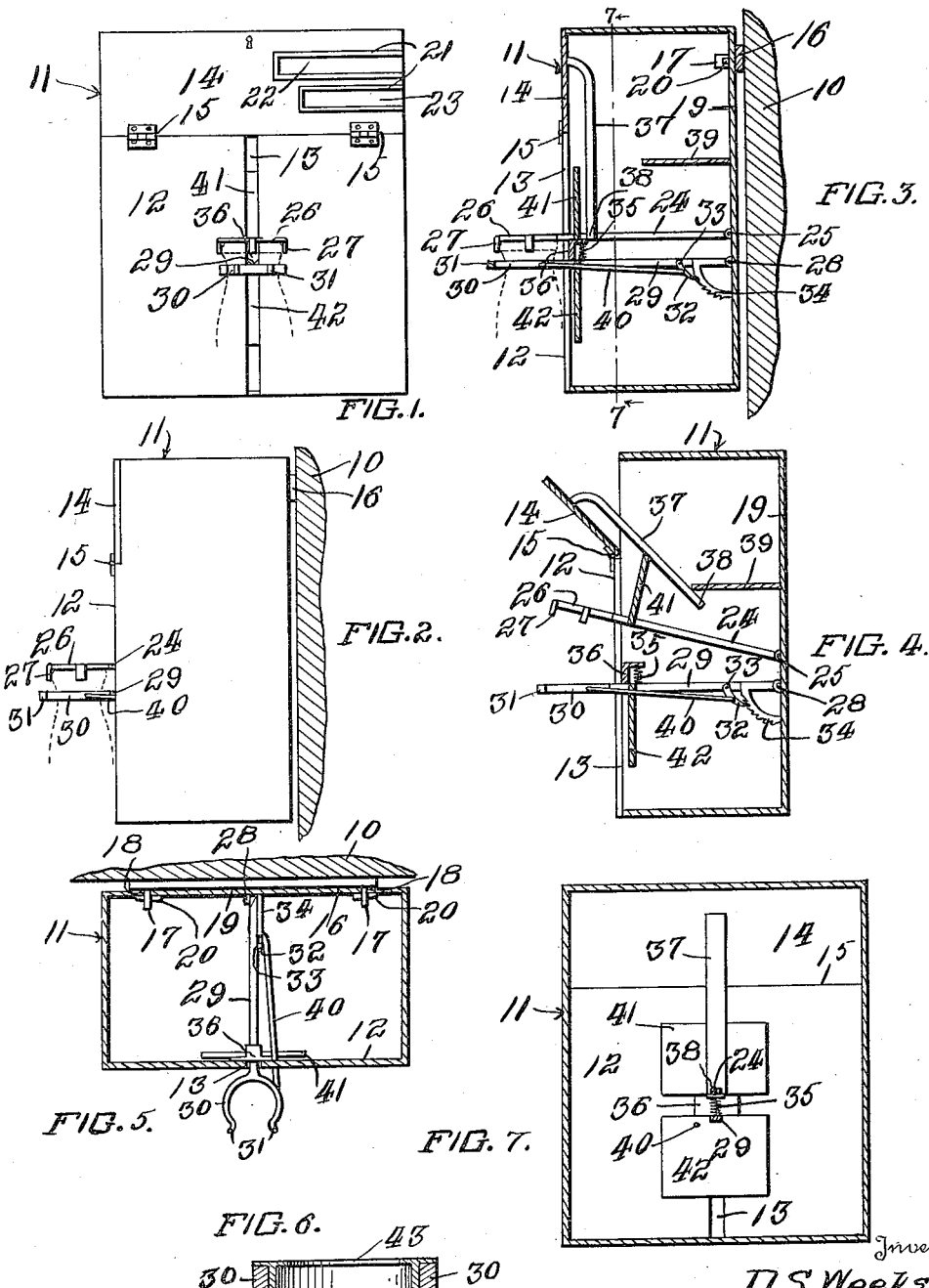

DEAN S. WEEKS, OF OAKLAND, CALIFORNIA.

MILK-BOTTLE HOLDER.

1,160,022.  Specification of Letters Patent.  Patented Nov. 9, 1915.

Application filed June 30, 1914. Serial No. 848,253.

*To all whom it may concern:*

Be it known that I, DEAN S. WEEKS, a citizen of the United States, residing at Oakland, in the county of Alameda, State of California, have invented certain new and useful Improvements in Milk-Bottle Holders, and I do hereby declare the following to be a full, clear, and exact description of the invention, such as will enable others skilled in the art to which it appertains to make and use the same.

This invention relates to receptacles, particularly to receptacles of such a type as to prevent articles disposed therein from being removed by thieves, and has for its object the provision of a novel milk bottle holder whereby bottles of milk placed therein by dairy men may not be removed by unauthorized persons or may not be tampered with by cats, or the like.

An important object is the provision of novel locking means whereby a milk bottle will be suspended by its neck and at the same time locked against removal.

Another object is the provision of a device of this character provided with removable indices as to the customer's name and the quantity of milk or cream which he desires left for him.

A further object is the provision of a device of this character which may be locked upon the wall of a house.

Other objects and advantages such as simplicity and cheapness, efficiency, durability in service, and the general improvement of the art will become apparent during the course of the following description, accompanied by the illustrative drawing, in which—

Figure 1 is a front elevation of my novel device holding a milk bottle, Fig. 2 is a side elevation thereof showing it attached to a wall, Fig. 3 is a central vertical section with the milk bottle in place, Fig. 4 is a similar view showing the door open and the milk bottle removed, Fig. 5 is a cross sectional view showing the neck engaging member in top plan, Fig. 6 is a detail view of the neck engaging member showing it adapted for holding a smaller necked bottle, and Fig. 7 is a vertical cross sectional view looking at the front of the casing.

Referring more particularly to the drawing the numeral 10 designates the wall of a house upon which my device, designated as a whole by the numeral 11, is adapted to be secured. My device comprises a casing, rectangular in shape and provided in its front wall 12 with a slot 13 and further provided with a door 14 hinged at 15 upon the front wall 12 and adapted to be locked by any suitable locking means, not shown.

In order to secure the casing upon the wall 10, I provide a plate 16 secured upon the wall and provided with lugs 17 passing through slots 18 in the back wall 19 of the casing and prevented from removal by transverse pins or wedges 20. The outer face of the door 14 is provided with track members 21 within which may be inserted cards or the like, 22 and 23, the former bearing the owner's name and the latter indicating the amount of milk, cream or buttermilk desired to be left. Any suitable receptacle may be disposed near the casing or within it for carrying a plurality of cards, such as, "One quart of milk", "One pint of cream", etc.

In order to provide means whereby the milk bottle may be held upon the casing, I provide an arm 24 pivoted as at 25 upon the rear wall 19 and carrying upon its forward end, exteriorly of the casing, a disk 26 carrying a plurality of depending tongues 27. The size of the disk 26 should be such that it may fit over the top of a milk bottle, with the tongues 27 engaging the rim. Disposed below the arm 24 and pivoted as at 28 upon the back wall 19, is a second arm 29 which carries at its forward end, exteriorly of the casing and directly below the disk 26, an integrally formed hook member 30 formed of resilient material and having its arms preferably flared outwardly at their ends as shown at 31. The arm 29 may be swung vertically within the casing and is normally held in its elevated position by a pawl 32 pivoted as at 33 upon the rod or arm 29 and engaging a toothed segment 34 secured upon the rear wall 19. A coil spring 35 is connected with the arm 29 and with a partition 36 extending across the slot 13 in the front wall 12 for returning the arm 29 to its original position after it has been moved. It will thus be seen that the arm 29 is normally securely held in a horizontal position.

In order that the arm 24 may be held down upon the top of a milk bottle having its neck engaged within the hook portion 30, I provide an arm 37 secured upon the door 14, extending downwardly parallel with the front wall 12 of the casing, and terminating in a forked end 38 engaging the top of the arm 24. A plate 39 is secured within the casing 11 and is engaged by the arm 37 when the door 14 is opened to prevent the door from swinging too far outwardly and so that the arm 37 will counteract the weight of the door to return it to its closed position, the door being provided with a spring latch.

A milk bottle is engaged upon the hook member 30 by squeezing the hook member 30 together, whereupon a rod 40 connected with one arm of the hook member and the pawl 32 will pull the pawl 32 out of engagement with the toothed segment 34, after which the arm 29 carrying the hook member 30 may be moved downwardly. The neck of the milk bottle is then pushed in between the flared ends 31 of the hook member. The spring 35 will pull the arm 29 upwardly so that the rim of the bottle will be engaged by the tongues 27 on the disk 26. At the same time the pawl 32 will be engaging the toothed segment 34. As the hook member 30 is then held expanded by the neck of the bottle it cannot be compressed or squeezed to release the pawl 32 and the arm 29 is consequently prevented from downward movement. As the fork end 38 of the arm 37 carried by the door engages the top of the arm 24, the arm 24 cannot be moved upwardly out of engagement with the milk bottle and the milk bottle cannot then be stolen.

In order that the proper person may remove the milk bottle, it is necessary that he unlock and open the door 14, whereupon the arm 37 will be moved upwardly and the fork 38 will be moved out of engagement with the arm 24. The arm 24 is then raised so that the tongues 27 will be disengaged from the rim of the bottle whereupon the bottle may be pulled out of the hook member 30. When the door is closed again the forked end of the arm 37 will force the arm 24 downwardly.

In order that the slot 13 may be kept closed at all times, I provide plates 41 and 42 on the arms 24 and 29 respectively which cover the slot and prevent the insertion of a wire or the like, for tampering with the pawl 32.

The hook member 30 is preferably made of a size to hold quart bottles, quart bottles having the maximum sized necks. In order to hold bottles having smaller necks, I provide a filler ring 43 adapted to be disposed upon the hook member 30 and embrace the neck of the bottle.

It will thus be seen from the foregoing description and a study of the drawing that I have provided a simple and novel holder for milk bottles so constructed that a bottle may be placed therein by the dairy men and removed by the proper person with the utmost ease, while at the same time theft of the bottle is prevented.

It will be readily understood that I reserve the right to make various changes in the form, construction and arrangement of parts without departing from the spirit of the invention or limiting the scope of the subjoined claims.

Having thus described my invention, I claim:

1. A milk bottle holder comprising a casing provided in its front wall with a slot, an arm pivoted within said casing and extending through said slot, a hook member on the end of said arm, a pawl carried by said arm, a link connected with said hook member and said pawl, a toothed segment secured within said casing and normally engaged by said pawl, a spring connected with said arm and said casing for normally holding it in a horizontal position, a second arm pivoted within said casing above said first named arm, a disk on the end of said second named arm adapted to be disposed over the mouth of a milk bottle, depending tongues on said disk engaging the rim of the bottle, a hinged door in the top of the front wall of said casing, and an arm carried by said door and engaging the top of said second named arm whereby said second named arm is held down with said disk and said tongues engaging the milk bottle held within said hook member.

2. A milk bottle holder comprising a casing provided in its front wall with a slot, an arm pivoted within said casing and extending through said slot, a milk bottle neck engaging member on the end of said arm, means for normally holding said arm in a horizontal position, a second arm pivoted within said casing above said first named arm, a milk bottle top engaging member upon the end of said second named arm, a door hinged in the front wall of said casing, and means carried by said door and normally engaging the top of said second named arm for holding it down in a horizontal position.

3. A milk bottle holder comprising a casing having a slot in its front wall, an arm pivoted within said casing and extending through said slot, resilient bottle neck engaging members on the end of said arm, means normally holding said arm in a horizontal position releasable upon movement of one of said resilient members to permit downward movement of said arm, a second arm pivoted within said casing above said first named arm and extending through said slot, a milk bottle top engaging member upon the end of said second named arm and coöperating with said first named member to hold a milk bottle against removal, a door hinged in the front wall of said casing, and means carried by said door and engaging said second named arm for holding said second named arm in coöperative relation with said first named arm.

In testimony whereof I affix my signature, in the presence of two witnesses.

DEAN S. WEEKS.

Witnesses:
 ABBIE R. STORER,
 SHERMAN P. STORER.